United States Patent
Takahashi

(10) Patent No.: US 10,031,723 B1
(45) Date of Patent: Jul. 24, 2018

(54) SYSTOLIC RANDOM NUMBER GENERATOR

(71) Applicant: Securion Systems, Inc., Clearfield, UT (US)

(72) Inventor: Richard J. Takahashi, Layton, UT (US)

(73) Assignee: SECTURION SYSTEMS, INC., Centerville, UT (US)

(*) Notice: Subject to any disclaimer, the term of this patent is extended or adjusted under 35 U.S.C. 154(b) by 0 days.

(21) Appl. No.: 15/450,531

(22) Filed: Mar. 6, 2017

Related U.S. Application Data

(60) Provisional application No. 62/305,065, filed on Mar. 8, 2016.

(51) Int. Cl.
*G06F 7/58* (2006.01)

(52) U.S. Cl.
CPC .................. *G06F 7/588* (2013.01)

(58) Field of Classification Search
CPC .................. G06F 7/57; G06F 7/588
See application file for complete search history.

(56) References Cited

U.S. PATENT DOCUMENTS

| | | | | |
|---|---|---|---|---|
| 4,667,301 A | * | 5/1987 | Chiu | G06F 7/584 380/46 |
| 4,825,397 A | * | 4/1989 | Muller | G06F 7/584 708/320 |
| 9,317,718 B1 | | 4/2016 | Takahashi | |
| 9,794,064 B2 | | 10/2017 | Takahashi | |

OTHER PUBLICATIONS

Wikipedia; Physical Unclonable Function; downloaded from https://en.wikipedia.org/wiki/Physical_unclonable_function; Feb. 24, 2017; 6 pages.
Wikipedia; Linear-Feedback Shift Register; downloaded from https://en.wikipedia.org/wiki/Linear-feedback_shift_register; Feb. 26, 2017; 9 pages.
Vasyltsov et al.; Fast Digital TRNG Based on Metastable Ring Oscillator; 17 pages; Samsung Electronics; Korea, 2008, 17 pages.
Dichtl et al.; High-Speed True Random Number Generation with Logic Gates Only; 18 pages; Siemens AG and Telecom Italia; Europe, 2007, 18 pages.

\* cited by examiner

*Primary Examiner* — Chuong D Ngo
(74) *Attorney, Agent, or Firm* — Greenberg Traurig LLP

(57) ABSTRACT

Systems and methods for a random number generator including a systolic array to receive a plurality of first inputs, and to provide a random number output. In one embodiment, the systolic array can be arranged in two or greater dimensions, and each cell of the array comprises a ring oscillator. Data is read from a random access memory to provide the inputs to the systolic array. A linear feedback shift register receives the random number output as a feedback signal used to address the memory to read data to provide as the inputs to the systolic array.

20 Claims, 7 Drawing Sheets

US 10,031,723 B1

SYSTOLIC RANDOM NUMBER GENERATOR

RELATED APPLICATIONS

This application claims priority to U.S. Provisional Application Ser. No. 62/305,065, filed Mar. 8, 2016, entitled "Systolic Random Number Generator," by Richard J. Takahashi, the entire contents of which application is incorporated by reference as if fully set forth herein.

FIELD OF THE TECHNOLOGY

At least some embodiments disclosed herein generally relate to random number generators, and more particularly, but not limited to, a random number generator using cells arranged in a systolic array configuration (e.g., a two-dimensional array of random sources in the form of cells that each include an oscillator).

BACKGROUND

A random number generator is a hardware device that generates random numbers. One application for random number generators is in cryptography, where they are used to generate random cryptographic keys, for example, to transmit data securely. These keys can be used, for example, in encryption protocols. Another exemplary application is use in any application requiring a random number such as gambling games, methods of statistical analysis, and lottery systems.

SUMMARY OF THE DESCRIPTION

Systems and methods for a random number generator are described herein. Some embodiments are summarized in this section.

In one embodiment, a random number generator includes a systolic array configured to receive a plurality of first inputs (e.g., input signals provided to a top and side of the systolic array), and to provide a random number output (e.g., for use by a host processor in cryptographic processing). The systolic array can be arranged in two or greater dimensions (e.g., a three-dimensional array).

In one embodiment, at least one memory (e.g., a static random access memory (SRAM)) is configured to provide the first inputs to the systolic array, and further configured to receive the random number output as a feedback signal (e.g., obtained from and clocked by a clock signal from an output register) used for addressing the memory to select the first inputs provided to the systolic array (e.g., the feedback signal may be provided to a shift register used to address the memory).

In one embodiment, a systolic array used in a random number generator comprises a plurality of cells, and each cell of the systolic array includes an oscillator; a first flip-flop coupled to receive a signal from the oscillator as an input and to provide a first output; an exclusive OR gate coupled to receive the first output; and a second flip-flop coupled to receive a signal from the exclusive OR gate as an input, and to provide an output to an adjacent cell in the systolic array.

In one embodiment, a random number generator includes a plurality of cells arranged in at least a two-dimensional systolic array, each cell comprising an oscillator, the systolic array to receive a plurality of first inputs in first and second sides of the array (e.g., a top side and a left side of the array), and the systolic array to provide a random number output; at least one memory is configured to provide the first inputs to the systolic array; and a shift register (e.g., a linear-feedback shift register) is configured to receive the random number output, and further configured to address the memory to select the first inputs to provide to the systolic array.

In one embodiment, each cell of a systolic array in a random number generator includes an oscillator (e.g., a free-running, ring oscillator). In one embodiment, each cell further includes a flip-flop to receive a signal from the oscillator. In one embodiment, each cell further includes an exclusive OR gate to receive a signal from the flip-flop as an input to the exclusive OR gate. In one embodiment, each cell provides an output signal to at least one adjacent cell in the array (e.g., bottom and right cells). In one embodiment, each cell further receives a signal from another cell (e.g., an adjacent top cell) as an input to the exclusive OR gate.

In one embodiment, a random number generator uses a physical unclonable function provided by a random access memory (e.g., an SRAM). Examples of the random number generator include the various embodiments of random number generators using a systolic array as described herein.

The disclosure includes methods and apparatuses which perform these methods, including computing devices and systems which perform these methods, and computer readable media containing instructions which when executed on computing devices and systems cause the devices and systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DESCRIPTION

Figure 1:
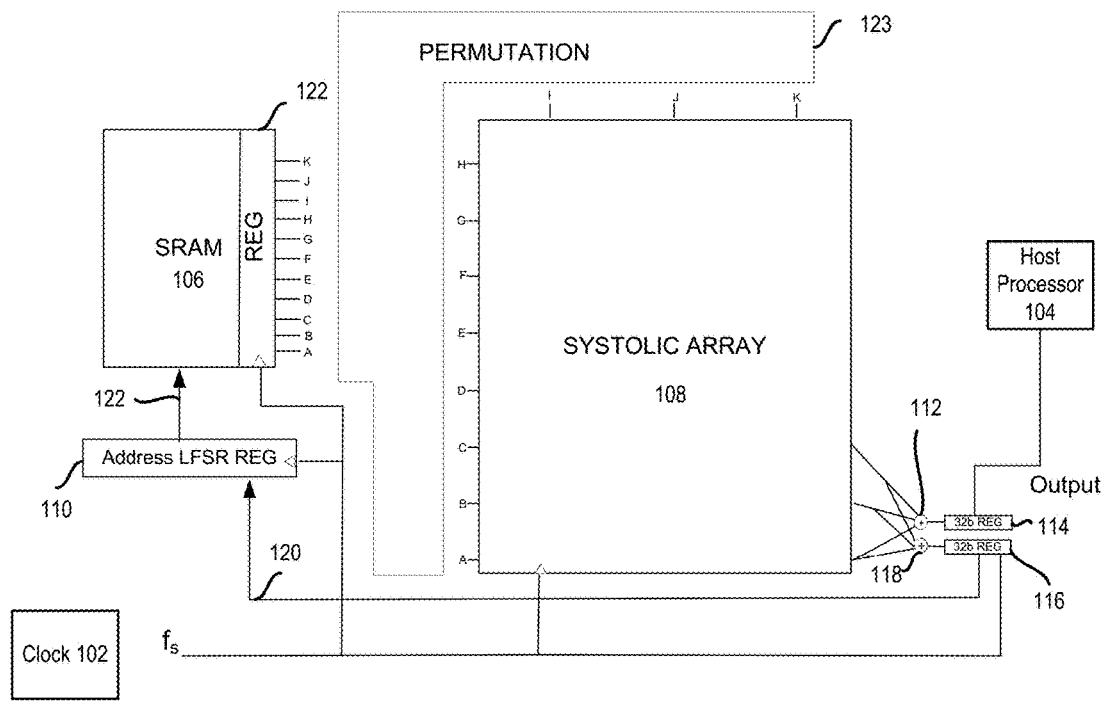
FIG. 1 shows an architecture for a random number generator (RNG) using a systolic array, according to one embodiment.

The following description and drawings are illustrative and are not to be construed as limiting. Numerous specific details are described to provide a thorough understanding. However, in certain instances, well known or conventional details are not described in order to avoid obscuring the description. References to "one embodiment" or "an embodiment" in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Various embodiments described in this disclosure provide a true systolic random number generator (RNG) design using cells (to provide a plurality of random sources) in a systolic array configuration, as described further herein.

In one embodiment, the random number generator architecture is implemented by using one or more field-programmable gate arrays (FPGAs) or integrated circuits.

In one embodiment, each cell of the systolic array comprises at least one flip-flop, an oscillator, and an exclusive OR gate. In one embodiment, the clock signal from the oscillator provides a frequency source that is re-clocked (e.g., using a D-type flip-flop) by a non-coherent or asynchronous clock (e.g., the fs signal below), as described further below. This adds meta-stability from the flip-flop as a random source.

In one embodiment, the systolic array design used is uniform and cellular, such that this design increases or maximizes FPGA logic and minimizes layout resources. In one embodiment, the systolic RNG described herein is implemented in, for example, 8×3 arrays of cells, where each systolic cell has a free-running oscillator and D-type flip-flops and an exclusive OR (EXOR) gate. This embodiment uses free oscillators, metastability conditions and an SRAM (e.g., which is either powered-up with random data or pre-loaded with random data) as the physical unclonable function (PUF) as the sources of randomness. Hardware implementations of this design are, for example, relatively small in size, robust, high-speed and have limited single-point failure tolerance. This embodiment provides a hardware-based design using a known random source and entropy generators.

This disclosure describes the systolic RNG operation in various embodiments, including a description in some examples of how each element functions to add entropy to the RNG design. A true RNG is a desirable component of a cryptographic system.

The disclosure below also describes variations, according to differing embodiments, of optional post-processing of the output from the systolic random number generator. This post-processing may be desirable to, for example, remove possible bias, correlation, and/or any second and third-order effects from FPGA or integrated circuit fabrication corner cases and environmental factors.

FIG. 1 shows an architecture for a random number generator (RNG) using a systolic array 108, according to one embodiment. The systolic array 108 provides a random number output at output registers 114 and 116. At least one memory 106 is configured to provide inputs A, B, C, . . . K to the systolic array 108. Memory 106 provides a physical unclonable function for the random number generator, as discussed herein. The connection between the memory 106 to the systolic array 108 is connected through a permuter 123. The permutation function of permuter 123 can be programmed to connect the memory 106 outputs (A, B, C, . . . K) to the systolic array 108 inputs (A, B, C, . . . K) in any order of connections. For example, these connections can be performed in any desired order, such as A to A, B to B, A to G, B to J, C to D, etc., using the permutation function of permuter 123.

A shift register 110 receives the random number output from output register 116, and addresses the memory to select the inputs A, B, C, . . . K to provide to the systolic array 108.

A shift register 110 receives the random number output as an input 120, and provides an output 122 used for addressing memory 106. A clock 102 provides a clock signal fs to each of a plurality of cells (see FIG. 3) in systolic array 108. The clock signal fs controls providing of the random number output (stored in output register 116) as the feedback signal to shift register 110. The clock signal fs clocks the providing the clocking to the output register 122 A, B, C, . . . K from memory 106, to the permutation function of permuter 123, to systolic array 108 input D-Flip-flops. In one embodiment, shift register 110 is a linear-feedback shift register that provides non-linear addressing to the memory 106. As one example, shift register 110 can use a Galois configuration.

Output registers 114 and 116 are each coupled to receive and store the random number output. Clock signal fs is provided to output register 116 to clock the providing of the feedback signal to shift register 110.

The clock signal is also provided to a register 122 coupled to memory 106. The clock signal clocks providing of the data that is read from memory 106, stored in register 122, and then provided as inputs A, B, C, . . . K to the systolic array 108. The clock signal fs also clocks the providing of an output signal from a flip-flop of each cell in a systolic array 108 to adjacent cells in the systolic array, as discussed in more detail below (see FIG. 3 and discussion below). The clock signal is further coupled to shift register 110 to control providing the address 122 to memory 106.

Exclusive OR gates 112 and 118 each receive outputs from at least two cells in the systolic array (see FIG. 3 below). The output from each exclusive OR gate provides the random number output to output registers 114 and 116. Output register 114 provides the random number output to host processor 104 via a host interface.

In one embodiment, a systolic RNG architecture consists of a systolic randomizer array, an interface for output register(s), and an SRAM physical unclonable function (PUF) with a linear-feedback shift register (LFSR) (e.g., of any type and register length of polynomials, Fibonacci or Galois or any non-linear counter design address registers), all clocked by a sampling clock fs (the sampling clock signal is illustrated in various embodiments herein, and is sometimes referred to herein as "fs").

In one embodiment, the use of an integrated circuit static random access memory (SRAM) design and fabrication processes provides SRAM cell power-up states that are unpredictable. The systolic array 108 in one example uses an 8-by-3 cell array in the systolic RNG. In other variations, the systolic array design can use larger (or smaller) array sizes.

In this embodiment, the SRAM PUF is used to seed the RNG systolic array at power-up. The SRAM will not have any reset and will power-up in an unknown state and will be unique to each FPGA or integrated circuit.

In one embodiment, the memory 106 is an SRAM that is addressed by an LFSR (linear feedback shift register with no reset) and also will power-up to an unknown state to address the SRAM, and then send the SRAM contents (as inputs A, B, C, . . . K as described above) to seed the systolic array 108.

In one example, the systolic array requires 15 fs clocks, or clocks greater than the LFSR size, prior to reading the random number output. This is required to flush the LFSR registers. The SRAM is addressed by the LFSR as discussed above. The LFSR will be loaded on each end-of-cycle count by the random number output of the systolic array (as provided by output register 116). This assures that the reading of the SRAM will be different on each end-of-address count cycle.

In one embodiment, the components of the RNG design include a systolic array, a SRAM PUF, and a host interface (e.g., the host interfaces to a central processing unit (CPU) of host processor 104). In this embodiment, these components operate with a single fs clock domain. The random sources for this RNG are based on each systolic cell (see FIG. 3) having a free-running asynchronous oscillator re-clocked by an asynchronous fs clock with D-type flip flop (also referred to below as a digital mixer) and EXOR'ed by inputs from adjacent cells of the systolic array.

In one embodiment, the D-type flip flop performs the frequency mixing operation between fs and the free-running asynchronous oscillator under a variety of input frequency conditions. The D-type flip flop output signal will alternate at the difference frequency (i.e., fs—free-running asynchronous oscillator signal). The output frequency is a rectangular wave whose long-term average frequency is the desired difference frequency. In addition, the output signal contains frequency jitter (a desired effect), which is a function of the relationship between the two input frequencies.

In one embodiment, the final output from the systolic array is EXOR'ed in a fail-safe configuration into, for example, two 32-bit registers 114 and 116 that host processor 104 will read. The host processor 104 reads both registers for data, and also checks for any invalid outputs (e.g. an output of all zeros or all ones).

A non-limiting example of a computing device that can be used as host processor 104 (e.g., to use the random number output in cryptographic processing) is described in U.S. Non-Provisional application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, which is hereby incorporated by reference in its entirety.

Figure 2:
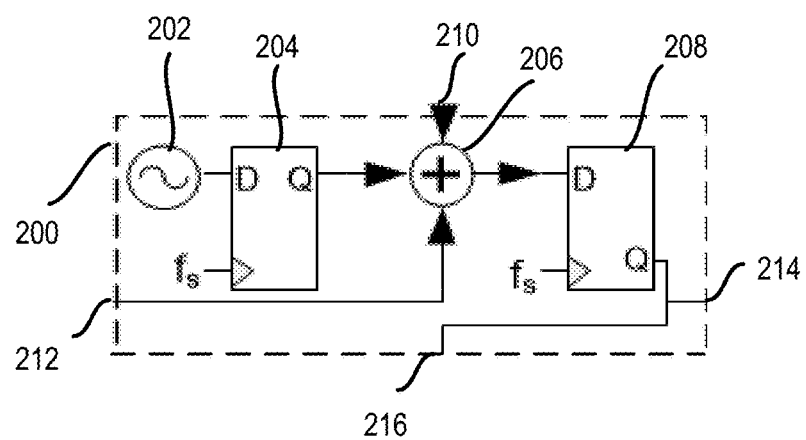
FIG. 2 shows a systolic cell of a systolic array, according to one embodiment.

FIG. 2 shows a systolic cell 200 as used in systolic array 108, according to one embodiment. The random number generator includes a plurality of cells arranged in at least a two-dimensional systolic array 108 (see FIG. 3). Each cell includes an oscillator 202, a flip-flop 204 coupled to receive an output signal from the oscillator 202 as an input and to provide a first output to an exclusive OR gate 206. Flip-flop 208 is coupled to receive a signal from the exclusive OR gate 206 as an input, and to provide output signals 214 and 216 to adjacent cells (not shown in FIG. 2) in the systolic array 108. The exclusive OR gate 206 is further coupled to receive output signals 210 and 212 from two adjacent cells (not shown in FIG. 2) of the systolic array.

Each of flip-flops 204 and 208 is clocked by clock signal fs from clock 102. In one embodiment, the frequency signal provided by oscillator 202 has a frequency less than the frequency fs of the clock signal.

In one embodiment, each systolic cell includes a free-running asynchronous oscillator clocked by clock signal fs, a D-type flip-flop, and a three-input EXOR gate re-clocked by another D-flip flop (digital mixer). The free-running asynchronous oscillator in each cell is also a PUF in that the final frequency is unique to each FPGA or integrated circuit. Each FPGA or integrated circuit (IC) is typically not manufactured exactly the same. Each FPGA or IC is unique in its fabrication process and operates uniquely (e.g., a function of fabrication process, voltage, and temperature across the integrated circuit), but are still within manufacturing tolerances.

Figure 3:
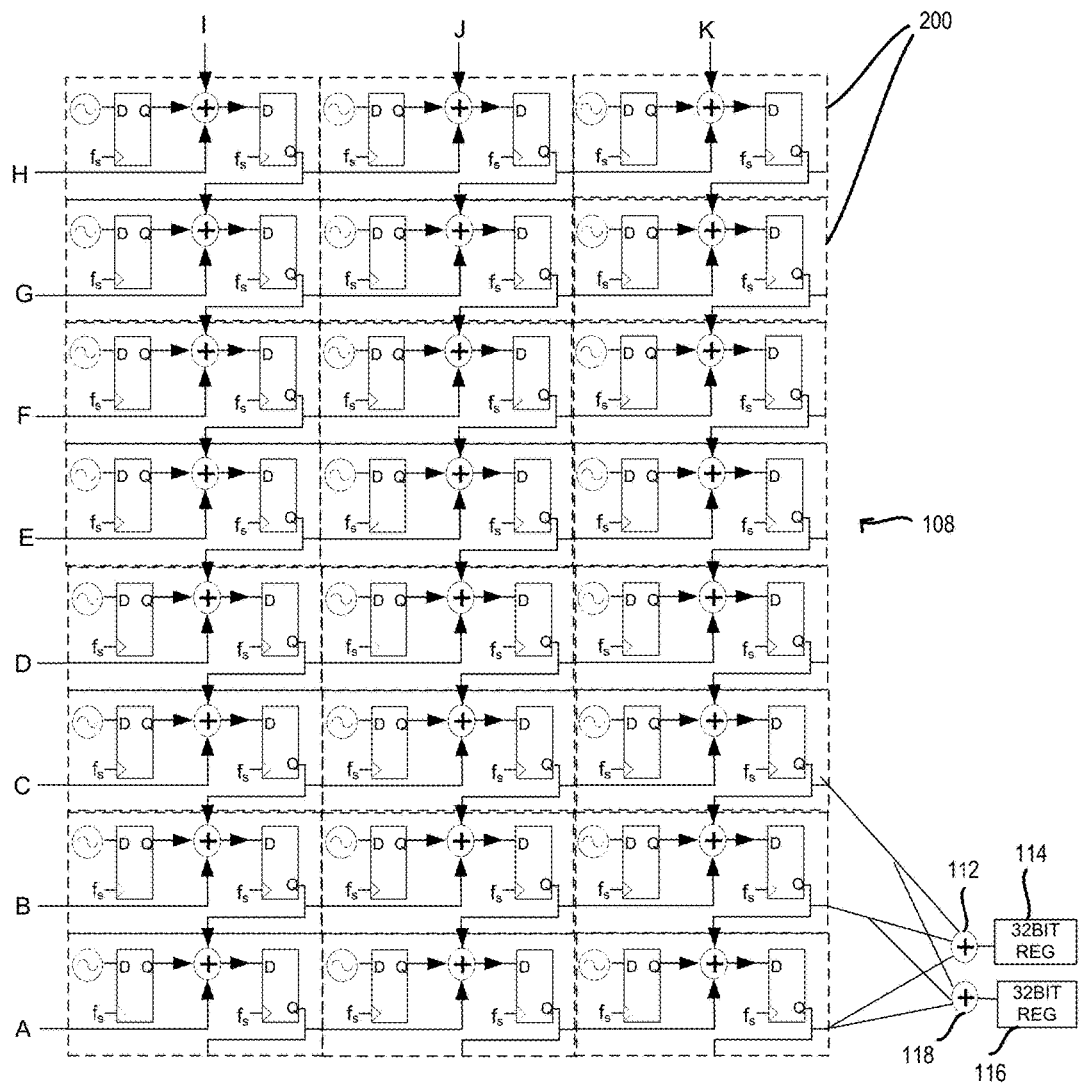
FIG. 3 shows a systolic array that can be used in the RNG of FIG. 1, according to one embodiment.

In one embodiment, each cell 200 in the array receives data inputs from side and top cells (also see FIG. 3). The cell 200 is basically a digital mixer. As the data is cascaded into the array, each cell adds the random output from each adjacent cell and finally outputs to the output registers 114 and 116. The digital frequency mixing is cascaded throughout the systolic matrix as random functions (i.e., use of the free-running asynchronous oscillator, and re-clocking with fs causes flip-flop metastability).

In one embodiment, jitter that is present is a contributor to the D-type flip-flop metastability, the fs clock is asynchronous to the free running oscillators (e.g., at a given prime number vale MHz frequency), and the clock adds to the uncertainty of each systolic cell output. The digital mixer output sequence from the free-running ring frequency oscillator provides an unknown state output given that a metastable state occurs as result of set-up or hold-time violations between the $F_{freq}$ and the sampling clock fs. The fs clock signal that is generated and the free-running asynchronous oscillator clock signal will have clock cycle-to-cycle jitter. This jitter will break-up contiguous sequences of outputs, or will delete or skip the sampled output from the free-running oscillator.

As one example, the cell oscillator frequency will be set at an 11-to-1 ratio of the fs frequency. For example, if fs is 75 MHz, the cell free-running ring frequency oscillator should be set for 825 MHz. This frequency ratio should be designed to be a prime number. In one embodiment, another approach used to provide dis-contiguous outputs by spreading the data from the free-running frequency oscillator is metastability as an isolation technique. Metastability performs the same results, in that the output from a D-type flip-flop (digital mixer) that has its set-up time violated will produce an un-predictable output. This technique adds to the randomness when tuned to violate the set-up time of a D-type flip flop at all times during operation. If FPGAs or integrated circuit are used to implement the RNG, this technique is technology and process dependent, and it provides further uncertainty.

FIG. 3 shows systolic array 108 as used in the RNG of FIG. 1, according to one embodiment. Systolic array 108 comprises cells 200 as discussed above. Systolic array 108 in general can have an arbitrary row by column size.

In general, as the array size increases, the randomness of the data increases. An example of an array size has dimensions of at least eight cells in each dimension.

Output signals from two or more cells 200 are provided as input signals to each of exclusive OR gates 112 and 118. The outputs from these gates are provided for storage in output registers 114 and 116 as the random number output discussed above.

In one embodiment, the systolic array consists of an 8×3 array with 24 cells and with 24 free-running ring oscillators (one oscillator 202 for each cell 200). This design can be scaled to additional ring oscillators as required. The left and top side inputs to the systolic array are provided from the SRAM PUF, as discussed above. After power-up, the SRAM's individual memory cells will power-up into an unknown state, and the SRAM data content is read into the systolic array as the initial seed values.

Additional details regarding random number generation using logic gates, and use of a ring oscillator in an RNG is provided in the following technical papers, which are hereby incorporated by reference herein in their entirety:

"High-Speed True Random Number Generation with Logic Gates Only", Markus Dichtl1 and Jovan Dj. Goli'c2.

"Fast Digital TRNG Based on Metastable Ring Oscillator" ihor Vasyltsov, et. al

Figure 4:
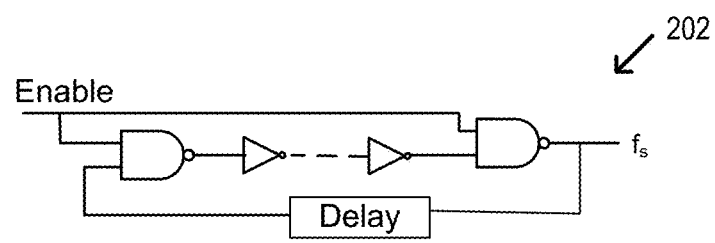
FIG. 4 shows a logic gate oscillator design that is programmable using different delays, for example for use in generating a clock signal fs, and/or for use in a cell of a systolic array, in one embodiment.

FIG. 4 shows a logic gate oscillator design that is programmable using different delays for use in generating the clock signal fs, and/or for use in a cell of a systolic array, in various embodiments.

In one embodiment, the systolic cell free-running ring frequency oscillator design used in each cell of the systolic array consists of inverters and NAND gates with an enable input ("Enable" as illustrated). Each oscillator leg is digitally mixed with a non-coherent fs sample clock. In this embodiment, the fs clock has, for example, at least 12 nanoseconds of cycle-to-cycle timing jitter. The fs clock also is a free-running ring frequency oscillator with jitter provided through FPGA or integrated circuit fabrication process-dependent factors such as regenerative logic threshold, thermal, and shot-flicker noise via cascading strings of gates, which all provide random contributing functions to the RNG. The higher the number of gates, the greater the jitter for the fs clock.

Figure 5:
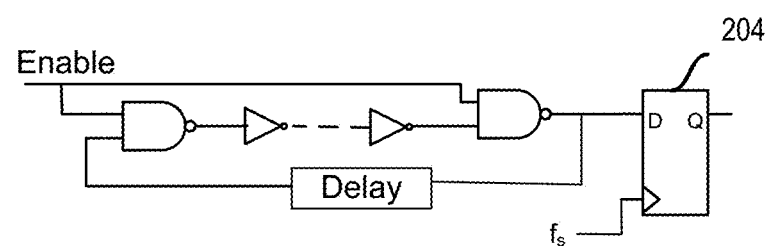
FIG. 5 shows a logic gate oscillator design that is programmable using different delays and a D flip-flop for use in a cell of a systolic array, in one embodiment.

The systolic cell frequency asynchronous oscillators are clocked using free-running oscillator fs. FIG. 5 shows an oscillator with a D-type flip-flop for use in a cell of a systolic array, in one embodiment. FIG. 5 illustrates the free-running asynchronous oscillators and D-type flip-flop (mixer) (see digital mixer discussion herein). It should be noted that the fs asynchronous clock frequency selection is technology dependent and preferably should be in, for example, the low hundreds to millions of MHz frequency range, and the fs clock frequency should further preferably be a prime value.

It is also preferred that the input to the D-type flip-flop be a prime frequency relative to fs. In one example, fs is 79 MHz, and the D-type flip-flop input frequency can be 763 MHz (a prime number).

In one embodiment, the free-running asynchronous oscillator is designed using ring oscillators implemented in logic gates with a feedback delay (illustrated in FIG. 5 as "Delay") to determine the frequency. In an implementation using FPGA gates, the actual frequency may not be a prime number. Instead, the frequency is a function of the actual design efforts to simulate gate delays, interconnect delay, and each gate's loading. Since the ring oscillators are designed using gate delays in a feedback configuration, each oscillator will build-up jitter as more gates are used. Therefore, a lower frequency will have a larger timing jitter, and thus larger or wider power spectrums. The jitter of the ring oscillator frequency and instability is a source of randomness.

Figure 6:
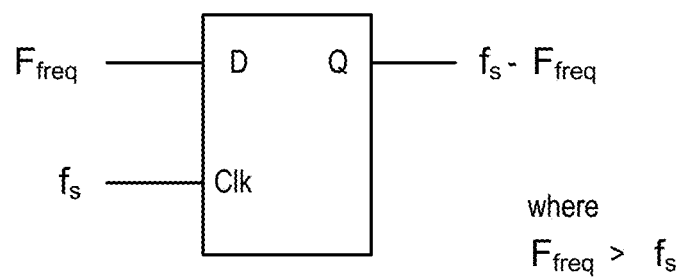
FIG. 6 shows a digital mixer in the form of a flip-flop for use in a cell of a systolic array, according to one embodiment.

FIG. 6 shows a digital mixer in the form of a flip-flop for use in cell 200 of systolic array 108, according to one embodiment. The mixing of two inputs is accomplished using this digital mixer. Although the illustrated digital mixer is similar to an input synchronizer, the digital mixer has distinct features if the two square wave inputs slowly "slip cycles" (also, see above mixer discussion).

The D-type flip-flop is used here as a mixer where the output Q provides a difference between two square waves of different frequencies provided as input signals. The D-type flip-flop is a simple form of a mixer. In other embodiments, more complex designs can be used based on the description provided herein (also, see mixer discussion).

The output of the D-type flip-flop alternates at the difference of (fs-$F_{freq}$) (i.e., the absolute value of the difference), where fs is the clock signal input from clock 102 (discussed above) and $F_{freq}$ is the D-type input to the D-type flip-flop. Conversely, the Q output is a logic zero if the input is a logic zero. However, if the two frequencies are non-coherent and slip cycles, the output will result in the fs-$F_{freq}$ frequency difference. Also, if the $F_{freq}$ signal is an odd integral multiple of the fs signal, the Q output generates rapidly alternating one and zero patterns.

In the above embodiment, the pattern differences of the mixer are increased where $F_{freq}$ and fs have cycle-to-cycle jitter. This uncertainty originates from an unstable frequency source. This cycle-to cycle jitter adds to the uncertainty of the $F_{freq}$-fs output including the second-order effects of the D-type flip-flop metastability. The jitter is used as an isolation value to break-up any sequence that may occur with a jitter-free clock.

Another feature of the digital mixer of FIG. 6 is that the output frequency has cycle-to-cycle timing phase jitter. This jitter is also related to phase jitter of the output difference frequency. The fs clock frequency determines the maximum jitter of the Q output. Since the input frequency $F_{freq}$ is sampled by fs, the worst case output frequency has a maximum jitter of fs divided by two on a cycle-to-cycle slip. In the randomizer design (digital mixer) the greater the difference between fs and $F_{freq}$, the greater the output frequency jitter. Given that fs is a perfect jitter source and that $F_{freq}$ is the free-running oscillator frequency to be mixed, and that both inputs are non-coherent and will slip-cycle, the Q output appears random.

In one embodiment, a power spectral density for the digital mixer Q output exhibits a Gaussian or normal density. Since the output effectively is fs–$F_{freq}$ plus or minus frequency deviations due to the slip cycle, the greater the jitter of the fs, the greater the frequency deviation. In a practical design, this frequency deviation has an upper bound. The output frequency will have a band of frequencies about the fs–$F_{freq}$ center frequency.

Figure 7:
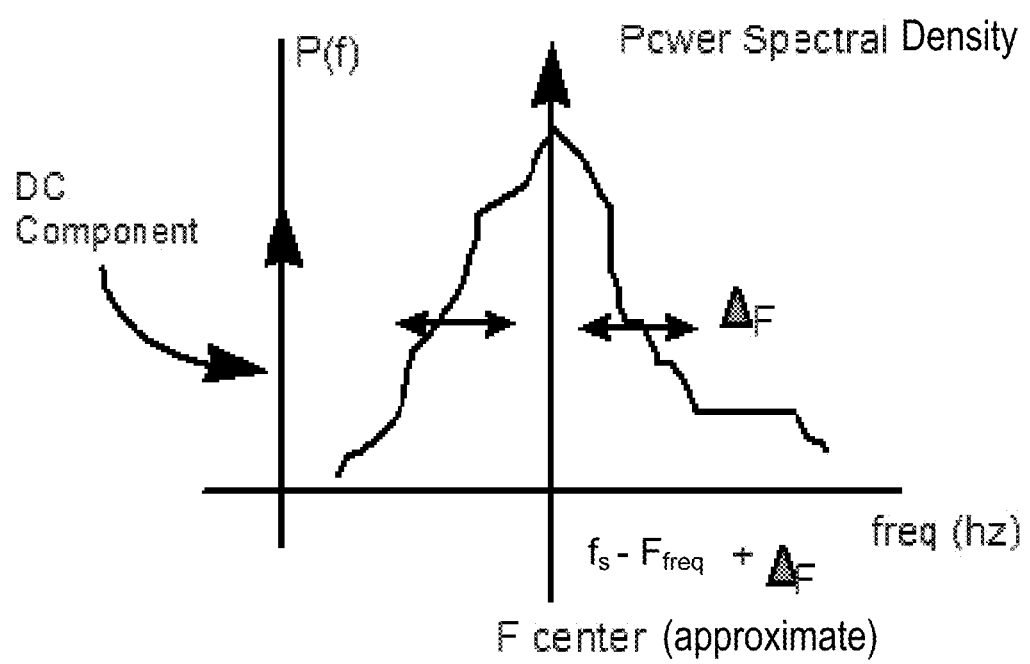
FIG. 7 shows an exemplary power spectral density.
Figure 8:
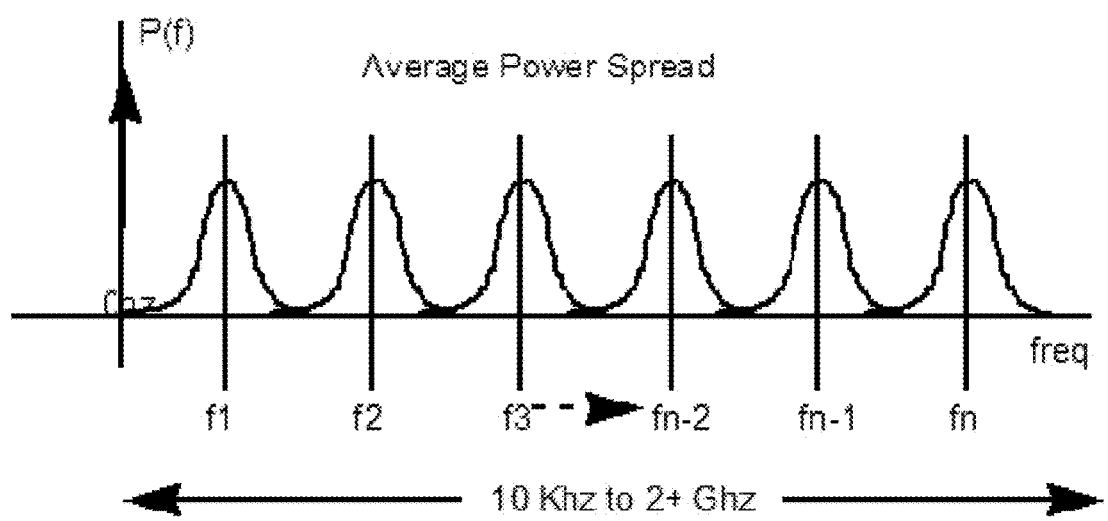
FIG. 8 shows an ideal spectrum of power spectral densities, according to one embodiment.

FIG. 7 shows an exemplary power spectral density. The power spectral density of a typical digital mixer is illustrated in FIG. 7. The power spectral density mixer output is a Fourier transform of the average autocorrelation of the output time sequence. A single digital mixer typically does not provide a good random source. Given multiple digital mixers with a uniform frequency spread for a KHz to GHz range, the result is a wider power spectral density with individually-centered power spectral densities. The KHz to GHz range is desirable, but the low frequency harmonics will adequately cover this range. An ideal power spectrum of power spectral densities typically appears as illustrated in FIG. 8, where f1, f2, . . . fn is the center frequency of each digital mixer with jitter-induced frequency deviations.

In one embodiment, the selection of a center frequency is chosen based on a prime number as a guideline. The reason for a prime number value is the physical phenomenon of an adjacent frequency coherently coupling via capacitance between oscillators or digital mixer outputs. Prime frequency harmonics tend not to couple. Therefore, the frequency is calculated to be a prime at the output of the mixer, and not the output of the free-running oscillator. In some designs, it is difficult to maintain this prime number value, and if physical isolation can be implemented, this coupling will be reduced or eliminated as a problem. Also, in FPGA designs, it is possible to manually insert the RNG oscillators into separate rows to reduce coupling. FIG. 8 shows an ideal spectrum of power spectral densities, according to one embodiment.

Output Registers

In one embodiment, the output of the systolic RNG is connected to two 32-bit or other size output registers 114, 116, as illustrated in FIG. 1. The systolic array cell outputs are EXOR'ed by gates 112, 118 to form a complex output sequence as the results. These results are clocked out to a host processor bus to host processor 104 using, for example, a ready flag or interrupt. The output of the systolic array 108 is clocked into the 32-bit register 116 and 114, as illustrated in FIG. 1, using clock 102 and read by the host processor 104.

In one embodiment, the host processor 104 uses 32-bit registers 116 and 114 to read the RNG. The EXOR function of gates 112, 118 is used to remove possible bias from the systolic array's output. In other embodiments, various other different EXOR configurations can be used to remove bias from the systolic RNG array.

In one embodiment, after power up of the RNG, as an example, 15 or greater fs clocks will initialize the systolic RNG array. Then, the data from the RNG systolic array can be read into the two output registers 114 and 116 (each illustrated in FIG. 1). The data stored in the output register 114 or 116 in FIG. 1 is the 32-bit random number result. At this point, the randomizer can be read (e.g., read by host processor 104).

In one embodiment, EXOR'ing the outputs from the cells of the RNG systolic array improves the statistical output of random data. Varying the EXOR configurations also can be used to tune the randomizer output quality. Adding other non-linear gates coupled with this EXOR logic such as, for example, NAND gates can also improve the randomizer output.

Exemplary Designs

In one non-limiting example, the following guidelines are used during design of the RNG system. In this example, each oscillator is designed with an enable input. During power-up, it is desirable to keep each oscillator leg in a disabled state until VDD (e.g., the DC power to the integrated circuit or other computing device in which the RNG is formed) is stabilized. This assures that the oscillator begins in a stable mode.

In one embodiment, before accessing output data from the RNG, there is a wait, for example, of 15 fs or greater clocks prior to utilizing the RNG systolic array. Each frequency oscillator is designed with a prime number delay value as a design guideline. A minimum of three inverting gates is used in the ring oscillator feedback in order to generate a high-frequency and noise.

Post-Processing

In one embodiment, during the read of the RNG, host processor 104 can perform additional post-processing functions on the RNG output. Also, host processor 104 can perform statistical checks for possible RNG output failures such as output data at the output register that is, for example, all zeroes or all ones, or alternating ones and zeroes, or repeating patterns, with each situation indicating an RNG hardware failure.

Closing

In one embodiment, the random number generator above is made in a computing device using FPGAs or ASICs by programming or implementing the RNG using a high-level design language, such as VHDL or Verilog.

At least some aspects disclosed can be embodied, at least in part, in software. That is, the techniques may be carried out in a computer system or other data processing system in response to its processor(s), such as a microprocessor, executing sequences of instructions contained in a memory, such as ROM, volatile RAM, non-volatile memory, cache or a remote storage device.

In various embodiments, hardwired circuitry (e.g., one or more hardware processors or other computing devices) may be used in combination with software instructions to implement the techniques above (e.g., the communication system may be implemented using one or more computing devices). Thus, the techniques are neither limited to any specific combination of hardware circuitry and software nor to any particular source for the instructions executed by the data processing system.

In one embodiment, a computing device may be used that comprises an inter-connect (e.g., bus and system core logic), which interconnects a microprocessor(s) and a memory. The microprocessor is coupled to cache memory in one example.

The inter-connect interconnects the microprocessor(s) and the memory together and also interconnects them to a display controller and display device and to peripheral devices such as input/output (I/O) devices through an input/output controller(s). Typical I/O devices include mice, keyboards, modems, network interfaces, printers, scanners, video cameras and other devices which are well known in the art.

The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system such as the computing device above is used to implement the random number generator and/or host processor.

In one embodiment, a data processing system such as the computing device above is used to implement a user terminal, which may provide a user interface for control of a computing device. For example, a user interface may permit configuration of the encryption gateway. A user terminal may be in the form of a personal digital assistant (PDA), a cellular phone or other mobile device, a notebook computer or a personal desktop computer.

In some embodiments, one or more servers of the data processing system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) and/or the memory above. For example, the functionalities described can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

In this description, various functions and operations may be described as being performed by or caused by software code to simplify description. However, those skilled in the art will recognize what is meant by such expressions is that the functions result from execution of the code by a processor, such as a microprocessor.

Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Hardware and/or software may be used to implement the embodiments above. The software may be a sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

Software used in an embodiment may be stored in a machine readable medium. The executable software, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A random number generator comprising:
 a plurality of cells arranged in at least a two-dimensional systolic array, each cell comprising an oscillator, the systolic array to receive a plurality of first inputs in first and second sides of the array, and the systolic array to provide a random number output;
 at least one memory configured to provide the first inputs to the systolic array; and
 a shift register configured to receive the random number output, and further configured to address the memory to select the first inputs to provide to the systolic array.

2. The random number generator of claim 1, wherein each cell further comprises a first flip-flop coupled to receive an input signal from the oscillator and to provide an output, and each cell further comprises an exclusive OR gate coupled to receive the output from the first flip-flop.

3. The random number generator of claim 2, further comprising a clock configured to provide a clock signal to each cell in the systolic array, wherein the clock signal is provided as an input to the first flip-flop.

4. The random number generator of claim 3, wherein the input signal has a frequency less than a frequency of the clock signal.

5. The random number generator of claim 2, wherein the exclusive OR gate is further coupled to receive inputs from two adjacent cells in the systolic array.

6. The random number generator of claim 2, wherein each cell further comprises a second flip-flop coupled to receive an input from the exclusive OR gate and to provide an output to an adjacent cell in the systolic array.

7. The random number generator of claim 6, further comprising a clock configured to provide a clock signal to each cell in the systolic array, wherein the clock signal is provided as an input to the first flip-flop and as an input to the second flip-flop.

8. The random number generator of claim 1, wherein the memory provides a physical unclonable function for the random number generator.

9. The random number generator of claim 1, wherein the shift register is a linear-feedback shift register.

10. The random number generator of claim 1, wherein the oscillator is a ring oscillator.

11. The random number generator of claim 1, further comprising:
an output register coupled to receive the random number output; and
a clock configured to provide a clock signal to the output register, to the memory, and to each cell in the systolic array, wherein the clock signal controls providing the random number output as an input to the shift register, providing the first inputs from the memory to the systolic array, and providing an output signal from a flip-flop of each cell to first and second adjacent cells in the systolic array.

12. The random number generator of claim 11, further comprising a first register configured to receive the first inputs from the memory, wherein the first register receives the clock signal to control providing the first inputs to the systolic array.

13. The random number generator of claim 11, wherein the clock signal is further coupled to the shift register to control providing the address to the memory.

14. The random number generator of claim 1, further comprising at least one exclusive OR gate configured to receive outputs from at least two cells in the systolic array, wherein an output of the at least one exclusive OR gate provides the random number output.

15. The random number generator of claim 14, further comprising a first output register and a second output register, each coupled to receive and store the random number output from the at least one exclusive OR gate, wherein the first output register provides the random number output to the shift register.

16. The random number generator of claim 15, wherein the second output register provides the random number output to a host processor.

17. A system comprising:
a systolic array configured to receive a plurality of first inputs, and to provide a random number output; and
at least one memory configured to provide the first inputs to the systolic array, and further configured to receive the random number output as a feedback signal for addressing the memory to select the first inputs provided to the systolic array.

18. The system of claim 17, further comprising:
a shift register configured to receive the random number output as an input, and to provide an output used for the addressing of the memory; and
a clock configured to provide a clock signal to each of a plurality of cells in the systolic array, wherein the clock signal controls providing the random number output as the feedback signal, and providing the first inputs from the memory to the systolic array.

19. A systolic array for a random number generator, the systolic array comprising a plurality of cells, each cell of the systolic array comprising:
an oscillator;
a first flip-flop coupled to receive a signal from the oscillator as an input and to provide a first output;
an exclusive OR gate coupled to receive the first output; and
a second flip-flop coupled to receive a signal from the exclusive OR gate as an input, and to provide an output to an adjacent cell in the systolic array.

20. The systolic array of claim 19, wherein the exclusive OR gate is further coupled to receive output signals from two adjacent cells of the systolic array.

* * * * *